Oct. 29, 1968

L. M. LEWIS 3,407,881

ALARM VALVE

Filed Oct. 26, 1966

INVENTOR.
LEROY M. LEWIS

BY

ATTORNEY.

United States Patent Office 3,407,881
Patented Oct. 29, 1968

3,407,881
ALARM VALVE
Leroy M. Lewis, 227 Darby Road, Paoli,
Chester County, Pa. 19301
Filed Oct. 26, 1966, Ser. No. 589,734
1 Claim. (Cl. 169—20)

ABSTRACT OF THE DISCLOSURE

A substantially cylindrical fitting, embracing under a radially directed head a gasket forming a seal with the valve housing into which it is threaded, has a cylindrical unthreaded projecting end extending into a bore in the valve seat bushing, a groove adjacent said end receiving a resilient O-ring gasket maintained under compression in said bore to form a "floating" fluid seal, the fitting adjacent its head having a polygonal opening coaxial with its bore for reception of a complementary tool whereby the fitting is seated in the valve housing.

---

This invention relates to fluid control valves for automatic sprinkler systems and the like and is especially directed to an improved combination of elements adapted for incorporation in such valves to afford indication of leakage past the valve or activation of the sprinkler system of which it is a component.

In my copending application, Ser. No. 457,143, filed May 19, 1965, I have disclosed a deluge valve in which the seat of the main fluid control clapper comprises an annular groove interposed between concentric annular sealing surfaces and a conduit communicating with said groove and with the exterior of the valve housing for conducting from the valve fluid passing into said groove, either because of seepage past a non-fluid tight seating when the valve is closed or upon activation of the sprinkler system resulting in opening of the valve for passage of fluid therethrough in quantity.

In said valve, however, the said conduit is extremely difficult to install, requiring soldering or brazing in a restricted area to insure fluid tight connections and in consequence it has been the practice not to utilize such conduits and, usually, associated alarm or indicator systems except where required by law or other supervisory authority.

In accordance with the present invention, however, there is provided a novel conduit means adapted for insertion into machined bores in a valve body with minimum of hand labor, and which affords adequate communication between the valve seat groove and the exterior of the body all so as greatly to simplify the installation and utilization of indicator and alarm systems of the type of those to which reference has been made.

It is therefore a principal object of the invention to provide novel conduit means adapted for the purpose of affording communication between a grooove in a valve seat and the exterior of the valve body for conveying from such groove any fluid that may flow thereinto, indicating at the exterior of the body, or through a remotely controlled alarm or indicator system of known character located at a space apart, that fluid has flowed or is flowing past the valve seat in which such groove is formed.

A further object is the provision of means which can readily be operatively yet removably installed in a threaded bore in a valve body without soldering or brazing and which are effective against leakage from the interior of the body save through the passage therefor which said means afford.

Other objects, purposes and advantages of the invention will hereinafter more fully appear or will be understood from the following description of a preferred embodiment of it illustrated in the accompanying drawing in operative association with a valve of known construction which may be deemed illustrative of the several kinds and types of valves with which said conduit means may be associated; in said drawing.

Figure 1:
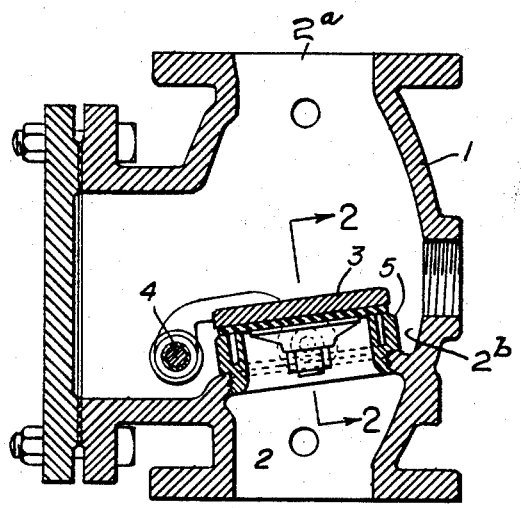
FIG. 1 is a vertical section through the valve showing the conduit means in operative relation thereto.
Figure 3:
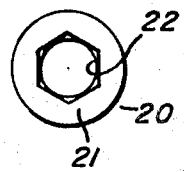
FIG. 3 is an end view of said conduit means removed from the valve.
Figure 2:
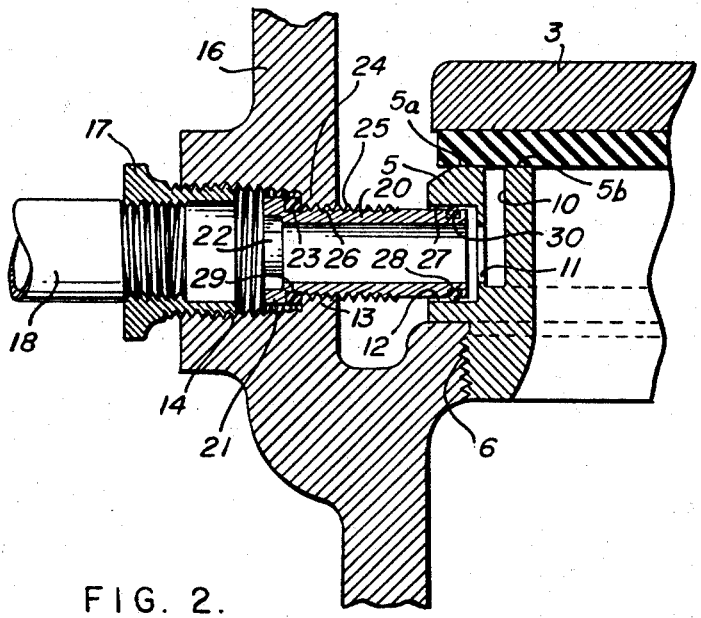
FIG. 2 is a fragmentary section on line 2—2 in FIG. 1 showing more clearly the internal construction of said conduit means in said relation but on a considerably larger scale.

Referring now more particularly to the drawing, the typical valve I have chosen to illustrate therein is of the class known in the automatic sprinkler industry as a "check valve" comprising a housing 1 providing a fluid passage 2 which is controlled by a valve clapper 3 pivoted on a pivot pin 4 carried by the housing for engagement with an annular valve seat bushing 5 threaded into an annular internal abutment 6, the clapper thus serving to prevent flow of fluid in one direction through passage 2 but being movable away from the valve seat on pivot 4 to permit unobstructed flow past the clapper in the opposite direction and thence through discharge port 2a. A groove 10 coaxial with valve seat bushing 5 divides the valve seat into spaced concentric annular parts 5a, 5b while the bottom of the groove communicates through a short radial passage 11 with a cylindrical socket 12 in bushing 5. Coaxial with the socket is an internally threaded bore 13 open outwardly into a larger bore 14 preferably internally threaded to receive a bushing 17 into which may be entered a pipe 18 for connection with a conventional alarm or indicator system (not shown).

The structure of the valve as thus far explained is not materially different from that of the corresponding parts of the valve disclosed in said prior application but whereas in said last mentioned valve a soldered tube connects the groove in the valve seat bushing with the exterior of the valve body, in accordance with the present invention I provide hollow threaded conduit means 20 which with suitable sealing means may be installed from the exterior of the valve and when so installed provides a duct of ample capacity, spanning the substantially annular space 2b surrounding the bushing for passage of fluid from the valve seat groove 10 to bore 14.

This conduit means, sometimes hereinafter referred to as a fitting, is preferably formed from stainless steel tube or bar stock by appropriate machining operations and comprises a cylindrical outwardly overhanging head 21 in the center of which is broached a hexagonal or other non-cylindrical wrench socket 22 for the reception of a complementary bar type wrench, similarly to the well known "Allen" screws and wrenches therefor. Externally head 21 is cylindrical and from its inner face, beneath which an annular neoprene gasket 23 is normally placed for sealing engagement with a radial rib 24 at the bottom of bore 14, the fitting has an external thread 25 engageable with an internal thread in bore 13 in the body of the valve. Beyond thread 25 and hence adjacent its inner end the fitting presents a smooth cylindrical surface 27 interrupted by a groove 28 which receives a resilient toroidal or O-ring 30 of neoprene or the like which is compressed between this groove and the inner wall of socket 12 to inhibit passage of fluid past it after the fitting is screwed home in the valve.

As will be evident from the foregoing threaded bore 13 and bore 14 as well as socket 12 in valve seat bushing 5 may be formed by simple machining operations to provide the openings described for reception of fitting 20 and that introduction of the latter is readily accomplished with the aid of a suitable wrench after gasket 23 and O-ring 30 have been positioned on it; obviously it may be readily removed for inspection or the like and reinserted with equal ease, the gasket and O-ring being reusable a substantially unlimited number of times but readily and inexpensively replaced should either become damaged for any reason.

While I have herein described with considerable particularity one embodiment of the invention especially as it may be combined and associated with a valve of the character of that illustrated in the drawing, it will be understood I do not desire or intend thereby to be limited or confined hereto in any way as changes and modifications in the form, structure and arrangement of component elements of said embodiment and in the nature and structure of the valve with which it may be associated or combined, whether with or without such modification and in the specific manner of its association with such valve, will readily occur to those skilled in the art and may be utilized if desired without departing from the spirit and scope of the invention as defined in the appended claim.

Having thus described my invention, I claim and desired to protect by Letters Patent of the United States:

1. In a valve having a body defining a chamber and a passage leading herefrom, a bushing between the chamber and passage forming a valve seat and provided with an annular groove surrounding the seat and a radial outwardly directed socket in its wall communicating with said groove, said socket having a smooth-bore cylindrical surface, the valve body having an internally threaded bore aligned with the socket and a bore of greater diameter coaxial therewith extending to the exterior of the body, a clapper pivoted on the body for movement to and from the seat to control the flow of fluid between the chamber and passage, removable means defining a duct having an enlarged threaded outer end engageable in said threaded bore and an inner end of smaller diameter than that of said socket and projecting into said socket, a resilient packing ring surrounding said end and adapted for sealing engagement with the socket wall, and a gasket surrounding said means proximate the bottom of the larger bore, said means having a radially directed head providing a flange cooperative with said bottom to embrace the gasket when said means is inserted through the larger and introduced into the smaller bore, a fitting comprising a body having a cylindrical internal bore communicating at one end with a polygonal opening coaxial therewith, a radially outwardly extending cylindrical head surrounding said opening, said body having a peripheral cylindrical seat adjacent said head and a threaded portion extending from said seat toward and other end of the body, an annular gasket disposed in said seat engaging said head, said body having a substantially cylindrical outer surface extending from said threaded portion toward said other end presenting an annular groove adjacent said end and toroidal yielding means disposed in said groove and extending radially outwardly therefrom.

References Cited
UNITED STATES PATENTS

| | | | |
|---|---|---|---|
| 2,219,218 | 10/1940 | Berger et al. | 285—39 X |
| 2,667,934 | 2/1954 | Rowley | 169—20 |
| 3,245,701 | 4/1966 | Leopold et al. | 285—39 X |

H. HENSON WOOD, JR., *Primary Examiner.*

V. M. WIGMAN, *Assistant Examiner.*